United States Patent [19]

Knochel

[11] 4,204,446
[45] May 27, 1980

[54] WORK TABLE AND HOLD-DOWN ASSEMBLY FOR POWER HAND SAW

[76] Inventor: E. Stanley Knochel, 4202 Glenmore Ave., Baltimore, Md. 21206

[21] Appl. No.: 958,201

[22] Filed: Nov. 6, 1978

[51] Int. Cl.² .............................................. B27B 19/00
[52] U.S. Cl. ....................................... 83/146; 83/546; 83/574; 83/750
[58] Field of Search ................. 83/447, 449, 574, 145, 83/146, 544, 545, 546, 750, 102.1; 30/275, 392–394, 371–377

[56] References Cited

U.S. PATENT DOCUMENTS

| | | | |
|---|---|---|---|
| 1,799,215 | 4/1931 | Colby | 83/746 |
| 2,764,189 | 9/1956 | Haydon | 83/102.1 |
| 3,117,600 | 1/1964 | Davis | 83/574 X |
| 3,478,786 | 11/1969 | Hendrickson | 30/275 X |

Primary Examiner—J. M. Meister
Attorney, Agent, or Firm—Shlesinger, Arkwright, Garvey and Dinsmore

[57] ABSTRACT

A work table and hold-down assembly for adapting a power hand saw such as a saber saw or jig saw for bench use. The assembly includes a work table which is clamped to the base of the saw, the work table having an opening through which the saw blade passes. A work hold-down member is held in adjustably spaced relation to the work table by a clamping swivel stem rotatably mounted in the opening of the work table, thereby permitting the work-holding member to be moved laterally with respect to the work. A safety shield carried by the work-holding member is in spaced, surrounding relation to the saw blade.

8 Claims, 14 Drawing Figures

WORK TABLE AND HOLD-DOWN ASSEMBLY FOR POWER HAND SAW

BACKGROUND OF THE INVENTION

Power hand saws including saber saw and jig saw are in common usage for certain types of wood work. In some instances, however, bench work is required and the hand saw is unusable for such purpose. U.S. Pat. No. 1,707,097 issued to Frank Ruschke on Mar. 26, 1927 discloses a portable, power driven saw which is adaptable for bench use by attaching a work table thereto inverting the hand saw so that the work rests on the work table, and securely holding the saw in position by means of a clamp which is fixed to a bench or the like.

Ruschke does not, however, disclose any work hold-down means for bench use as is conventional with bench saws, as illustrated in U.S. Pat. Nos. 2,654,405 issued to Buford W. Hulfish on Oct. 6, 1953 and 2,764,189 issued to John E. Haydon on Sept. 25, 1956. Ruschke further does not disclose any means for shielding the operator from injury when the saw is in the inverted position for bench use. Ruschke further discloses a power saw of a particular design in order to permit clamping thereof for bench use.

SUMMARY OF THE INVENTION

The present invention is a work table and hold-down assembly for attachment to a conventional, power hand saw, such as a saber saw or jig saw, to adapt the same for bench use by inversion of the saw and securement thereof in a fixed position.

The present assembly includes a work table which is detachably engaged with the base of the inverted power hand saw, the work table having an opening through which the saw blade passes for engagement with the work. A work hold-down member is adjustably mounted in spaced relation to the work table by a clamping swivel stem which is rotatably mounted in the work table opening so that the stem and work hold-down member may be automatically moved out of the path of the work as necessary during the sawing operation.

The present assembly further includes a tubular safety shield which is positioned on the work hold-down member and extends in surrounding, spaced relation to a portion of the saw blade and clamping swivel stem, to protect the operator from injury.

The power hand saw is fixedly held in inverted position for bench use and, in order to prevent damage to the handle portion of the saw which is clamped in a vise or the like, metal pins are positioned in transverse openings therein, the ends of which pins are engaged by the vise jaws to protect the saw housing from damage.

DETAILED DESCRIPTION OF THE INVENTION

Figure 1:
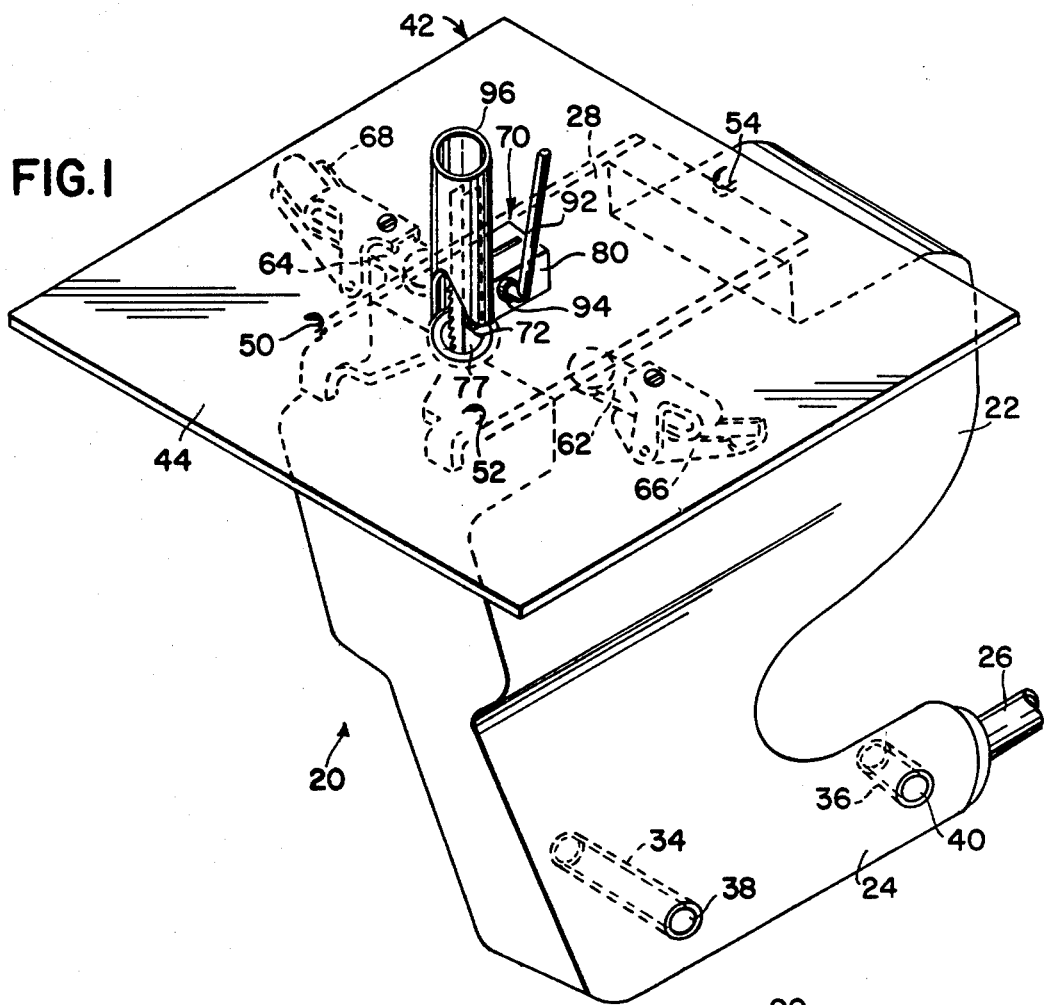
FIG. 1 is a perspective view of the present invention, illustrating its application.
Figure 2:
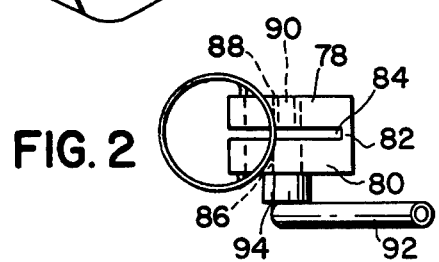
FIG. 2 is a top plan view of the work hold-down and safety shield unit forming a part of the present invention.
Figure 3:
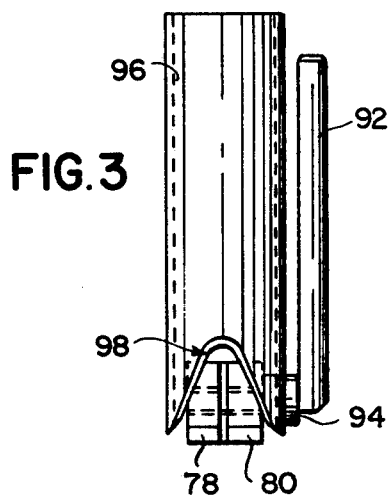
FIG. 3 is a front elevational view of the same.

Referring now in greater detail to the invention, the work table and hold-down assembly of the present invention is adapted for use in combination with a conventional power hand saw 20 such as a saber, jig, or scroll saw, the saw including a housing 22, a handle 24 and an electric cord 26 connected to a sutiable A.C. electrical source. A base 28 is suitably connected to the bottom of housing 22 and a chuck 30 extends from the housing for holding a reciprocating saw blade 32.

In accordance with the present invention, for bench use, the power saw is adapted to be held in inverted position by a bench vise or the like, which holds handle 24. In view of the fact that housing 22 and handle 24 are conventionally made of plastic material, transverse bores 34 and 36 are drilled through handle 22, and pins 38 and 40 respectively are inserted through the bores, the pins extending slightly beyond the limits of handle 24, so that when the saw is placed in a bench vise, the jaws of the vise engage the ends of pins 38 and 40 and not the handle 24.

Figure 13:
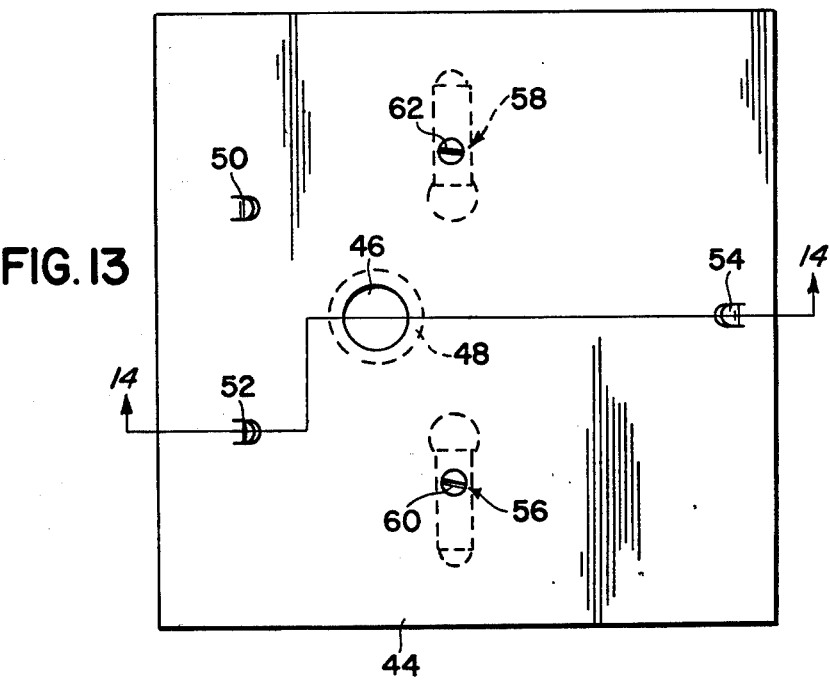
FIG. 13 is a top plan view of the work table forming a part of the present invention.
Figure 14:
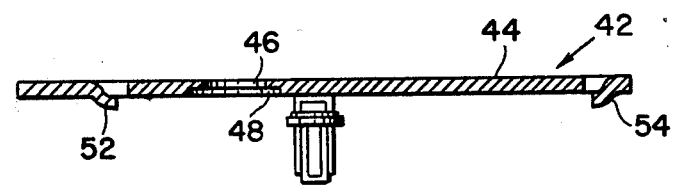
FIG. 14 is a sectional view taken along the line 14—14 of FIG. 13, looking in the direction of the arrows.
Figure 10:
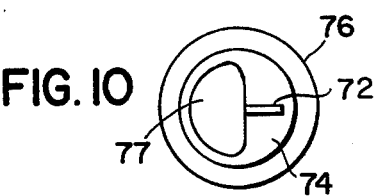
FIG. 10 is a top plan view of the clamping swivel stem forming a part of the present invention.
Figure 11:
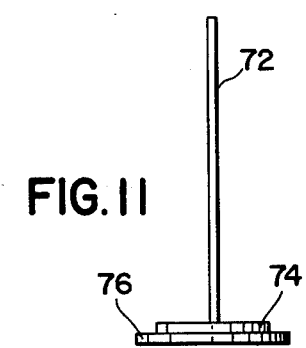
FIG. 11 is a front elevational view thereof.
Figure 12:
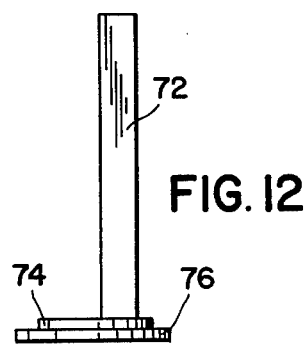
FIG. 12. is a side elevational view thereof.

The work table and hold-down assembly of the present invention includes a work table generally designated 42, which is shown to advantage in FIGS. 1 and 13. Work table 42 preferably comprises a square flat metallic member 44 having an eccentric circular opening 46 which is counter-bored at 48 for purposes which will be hereinafter more fully set out. At points adjacent opposed lateral edges of flat member 44, there are provided a plurality of struck portions comprising detents 50, 52 and 54 which are adapted to engage opposed lateral edges of base 28, of saw 20, to prevent casual relative movement between saw base 28 and work table 42 during operation. Work table 42 is clamped to saw base 28 by a pair of like clamps 56 and 58 which are secured to member 44 at 60 and 62 respectively. Clamps 56 and 58 may be of any suitable construction which will engage and hold work table 42 to saw base 28, such as base-engaging members 62 and 64 which are held in retaining position by locking members 66 and 68 which are in pivotable engagement with members 62 and 64.

It is a salient feature of the present invention to provide in conjunction with work table 42, a work hold-down and safety shield member, generally designated 70. Member 70 includes a clamping swivel stem 72 of elongated metal construction, one end of which is eccentrically secured to, and extends outwardly from, disk 74, the size of which is adapted for insertion into opening 46 of work table 42. A second disk 76 is integrally and concentrically formed with disk 74 and is of a larger diameter than disk 74, for reception in counterbored portion 48 of opening 46, the outer face of disk 76 being adapted to be supported on base 28 so that the disks 74 and 76 and connected stem 72 are free to swivel within the work table opening. A semi-circular opening 77 is provided in disks 74 and 76 for passage of saw blade 32 therethrough.

Member 70 further includes a work hold-down of integral construction which comprises opposed block portions 78 and 80 joined at one end by a thin connecting web 82. The space 84 between block portions 78 and 80 is substantially equal to the thickness of swivel stem 72 which is adapted for insertion therebetween.

In order to retain stem 72 in position, blocks 78 and 80 are provided with aligned transverse bores as indicated at 86 and 88, the latter bore being threaded for engagement with a complementally threaded shaft 90 which extends through bores 86 and 88, one end of the shaft being connected to a locking handle 92. A stop block 94 is fixed to handle 92 and contiguous with block 80.

Figure 4:
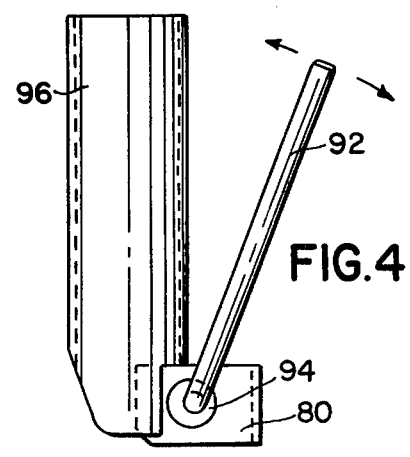
FIG. 4 is a side elevational view thereof.
Figure 5:
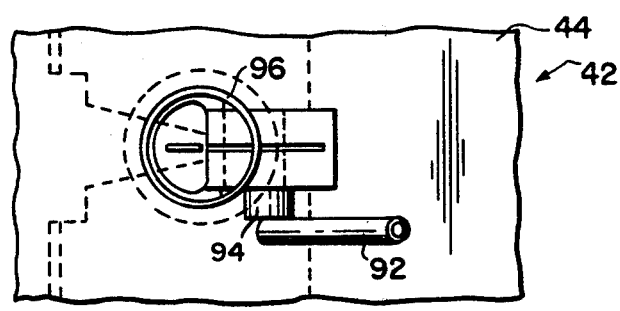
FIG. 5 is a fragmentary top plan view of the present invention, illustrating its use.
Figure 6:
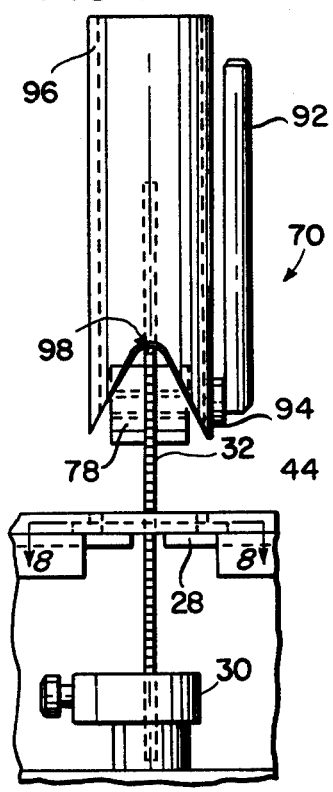
FIG. 6 is a fragmentary front elevational view thereof.
Figure 7:
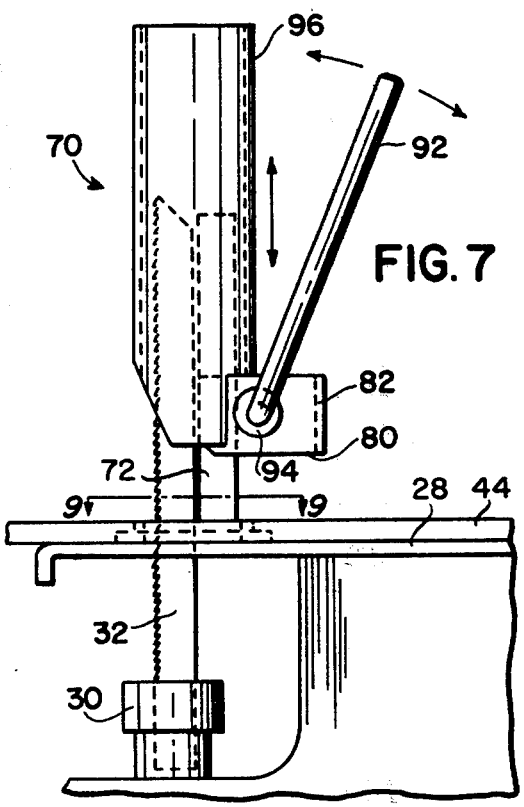
FIG. 7 is a fragmentary side elevational view thereof.
Figure 8:
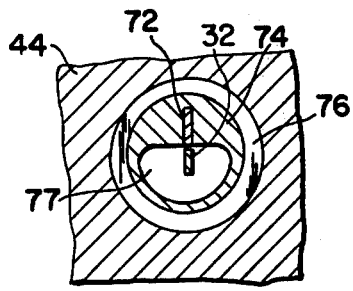
FIG. 8 is a sectional view taken along the line 8—8 of FIG. 6, looking in the direction of the arrows.
Figure 9:
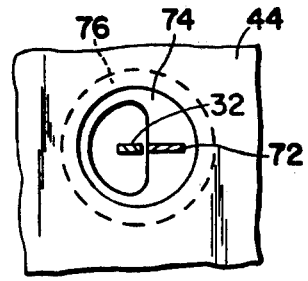
FIG. 9 is a sectional view taken along the line 9—9 of FIG. 7 looking in the direction of the arrows.

By operating locking handle 92 in one direction, as illustrated to advantage in FIGS. 4 and 7, block portions 78 and 80 are urged towards each other to frictionally engage swivel stem 72, for holding the assembly in position. Movement of handle 92 in the opposite direction urges block portions 78 and 80 apart and releases stem 72 in order to permit relocation of member 70 longitudinally thereof.

Assembly 70 further includes a tubular safety shield 96 which is affixed in any suitable manner to block 78 or 80 and extends upwardly above the work hold-down in spaced, surrounding relation to swivel stem 72 and saw blade 32. The front lower portion of safety shield 96 is cut out to provide a recess 98 for increased visibility by the operator of the work being sawed.

OPERATION

In adapting power hand saw 20 for use, the handle portion 24 thereof is inserted between the jaws of a work bench vise so that the ends of pins 38 and 40 engage the jaws as the vise is tightened, to securely hold the saw in position.

Clamping swivel stem 72 is next inserted through opening 46 of work table 42 so that disks 74 and 76 be within opening 46 and counter-bore 48. Work table 42 is then placed on saw base 28 and detents 50, 52 and 54 are engaged over oposed edge portions of base 28. Locking members 66 and 68 of the clamps carried by the work table are operatively engaged with the base of the saw to hold the work table in fixed position. Member 70 is held in position by saw base 28 upon which disk 76 rests.

Work hold-down and safety shield member 70 is next positioned by inserting stem 72 in space 84 between block portions 78 and 80 following which the assembly is moved longitudinally of the stem until the member is the desired distance from the table 42. Handle 92 is then moved to locking position to securely hold the work hold-down in position.

The piece to be sawed is next placed on work table 42 and moved into engagement with saw blade 32 to effect the desired cutting action. Cut out recess 98 of tubular safety shield 96 enables the operator to clearly see the work piece at all times, while at the same time being protected from injury by the shield.

As the work piece is moved from one position to another on work table 42, the eccentric mounting of clamping stem 72 on rotatable disks 74 and 76 enables the stem and the work hold-down and safety shield member 70 connected thereto to swivel out of the path of the work piece so that there is no interference with the work at any time. Due to the close proximity of swivel stem 72 to the saw blade, as illustrated in FIG. 7, the stem serves as a guard for the saw blade to help protect it against breakage caused by undue force being placed thereon during the sawing operation.

With the present invention, a power hand saw, such as a saber saw or jig saw, may be readily and economically adapted for bench use by attaching a few simple parts to the saw, which parts are also quickly removable when it is desred to use the power hand saw in a conventional manner. Additionally, there is provided means for holding the work and guarding the operator from injury which is comparable to that provided by a conventional bench saw.

While there has been herein shown and described the presently preferred form of this invention, it is to be understood that such has been done for purposes of illustration only, that various changes may be made remaining within the scope of the dependent claims.

What is claimed:

1. In combination with a power hand saw having a housing, a reciprocating saw blade mounted in the housing and a base supported by the housing, a work table and hold-down assembly for adapting the saw for bench use, said assembly including
    (a) a work table having an opening therein through which said saw blade passes,
    (b) a first means for securing said work table to the hand saw base,
    (c) a work hold-down member, and
    (d) a second means engaged with said work hold-down member and said work table for holding the former in spaced relation to the latter,
    (e) said second means being swivelly mounted on said work table in surrounding relation to the saw blade, whereby said second means and said hold-down member engaged therewith may be swivelled around the saw blade to move the same out of the path of the work during the sawing operation.

2. The assembly of claim 1, wherein:
    (a) said work table comprises a flat member, and
    (b) said first means includes struck portions on said flat member providing detents engageable with opposed lateral edges of said saw base,
    (c) said first means further including clamps carried by said flat member detachably engaged with said saw base.

3. The assembly of claim 1, wherein:
    (a) said second means includes a disc member rotatably mounted in the work table opening,
    (b) said disc member being provided with an opening through which said saw blade passes,
    (c) an elongated member extending outwardly from a face of the disc member, and
    (d) a third means for adjustably securing said work hold-down member to said elongated member in spaced relation to said work table.

4. The assembly of claim 3, wherein:
    (a) said elongated member comprises a clamping stem eccentrically engaged with said disk member.

5. The assembly of claim 4, wherein:
    (a) said work hold-down member includes spaced, opposed block portions,
    (b) web means connecting said opposed block portions, (c) said clamping stem being positioned between said spaced, opposed block portions, and
(d) handle means for urging said block portions towards each other to frictionally hold said clamping stem.

6. The assembly of claim 1, with the addition of:
(a) a shield positioned on said work hold-down member and in spaced, surrounding relation to said saw blade.

7. In combination with a power hand saw having a housing having a handle portion, a reciprocating saw blade mounted in the housing and a base supported by the housing, a work table and hold-down assembly for adapting the saw for bench use, said assembly including:
(a) a work table,
(b) said work table including a flat rigid member having a counter-bored opening through which the saw blade passes,
(c) said flat rigid member having a plurality of struck portions providing detents engageable with opposed edges of said rigid member,
(d) clamps carried by said rigid member detachably engaged with said saw base,
(e) a disk member comprising disk portions of different diameters positioned in the counter-bored opening of said work table.
(f) said disk member having an opening through which said saw blade passes,
(g) a clamping stem eccentrically affixed to one face of said disk member,
(h) a work hold-down member detachably engaged with said clamping stem,
(i) said work hold-down member including a pair of opposed, spaced block portions joined by a connecting web,
(j) said clamping stem being inserted between said opposed, spaced block portions, and
(k) means for holding said work member in engagement with said clamping stem.

8. The assembly of claim 7, with the addition of:
(a) a tubular safety shield positioned on said work hold-down member and in spaced, surrounding relation to said saw blade.

* * * * *